(12) United States Patent
Pfeuffer et al.

(10) Patent No.: US 9,083,128 B2
(45) Date of Patent: Jul. 14, 2015

(54) LOW INDUCTANCE BUS BAR CONNECTION

(71) Applicant: Magna E-Car Systems of America, Inc., Aurora (CA)

(72) Inventors: Viktor Pfeuffer, Royal Oak, MI (US); Ajay V. Patwardhan, Novi, MI (US); Bert Mohr, Ann Arbor, MI (US)

(73) Assignee: Magna E-Car Systems of America, Inc., Aurora, Ontario (CA)

( * ) Notice: Subject to any disclaimer, the term of this patent is extended or adjusted under 35 U.S.C. 154(b) by 0 days.

(21) Appl. No.: 14/068,793

(22) Filed: Oct. 31, 2013

(65) Prior Publication Data

US 2014/0342612 A1    Nov. 20, 2014

Related U.S. Application Data

(60) Provisional application No. 61/720,554, filed on Oct. 31, 2012.

(51) Int. Cl.
    *H01R 25/14*    (2006.01)
(52) U.S. Cl.
    CPC ..................................... *H01R 25/14* (2013.01)
(58) Field of Classification Search
    USPC ................. 439/212, 207, 117, 210, 852, 885; 174/68.2, 72, 74; 361/829, 611
    See application file for complete search history.

(56) References Cited

U.S. PATENT DOCUMENTS

| | | | | |
|---|---|---|---|---|
| 2,733,289 A * | 1/1956 | Warren et al. | ................ | 174/99 B |
| 3,210,716 A * | 10/1965 | Meacham | ..................... | 439/117 |
| 3,315,132 A * | 4/1967 | Lucas | ............................ | 361/829 |
| 5,213,518 A * | 5/1993 | Weidler | ........................ | 439/211 |
| 5,554,040 A * | 9/1996 | Sugiura et al. | ................ | 439/212 |
| 5,854,445 A * | 12/1998 | Graham et al. | ............. | 174/99 B |
| 5,866,850 A * | 2/1999 | Kobayashi | ........................ | 174/98 |
| 6,381,122 B2 * | 4/2002 | Wagener | ........................ | 361/611 |
| 6,489,567 B2 * | 12/2002 | Zachrai | ..................... | 174/149 B |
| 6,629,850 B2 * | 10/2003 | Kato et al. | ..................... | 439/76.2 |
| 6,781,818 B2 * | 8/2004 | Josten et al. | ................... | 361/611 |
| 8,383,939 B2 * | 2/2013 | Gotou | ........................... | 174/68.2 |
| 8,684,759 B2 * | 4/2014 | Adachi et al. | ................. | 439/262 |
| 8,686,288 B2 * | 4/2014 | Kalayjian et al. | ............ | 174/68.2 |
| 8,734,173 B2 * | 5/2014 | Suzuki et al. | .................. | 439/262 |
| 8,765,289 B2 * | 7/2014 | Ikeda et al. | ..................... | 429/160 |
| 8,802,984 B2 * | 8/2014 | Kosaki et al. | ................... | 174/64 |
| 8,822,062 B2 * | 9/2014 | Ikeda et al. | ..................... | 429/160 |
| 8,881,481 B2 * | 11/2014 | Myers et al. | ................. | 52/506.08 |
| 2006/0239050 A1 * | 10/2006 | Andersson et al. | ........... | 363/132 |
| 2006/0272256 A1 * | 12/2006 | Frecska et al. | .............. | 52/506.07 |

* cited by examiner

*Primary Examiner* — Alexander Gilman
(74) *Attorney, Agent, or Firm* — Dickinson Wright PLLC

(57) ABSTRACT

In one aspect, a set of male and female bus bars is provided. The male bus bar includes first and second conductors and an insulation layer therebetween. The male bus bar has a male connecting portion with one or more fingers. The female bus bar third and fourth conductors and an insulation layer therebetween. The female bus bar has a female connecting portion with one or more receptacles, each having contact surfaces that are free of insulation and that are positioned to contact contact surfaces on an associated finger which are free of insulation so as to connect the first conductor and the third conductor and to connect the second conductor and the fourth conductor. Each finger has a width. A gap exists between the contact surfaces of an associated receptacle. The width and gap are sized to provide a press fit between the fingers and the receptacles.

6 Claims, 2 Drawing Sheets

LOW INDUCTANCE BUS BAR CONNECTION

FIELD

This disclosure relates to the art of electrical connectors and more particularly to a low inductance bus bar connector for electrically connecting high voltage components in an electric vehicle.

BACKGROUND

An electric vehicle typically has an electric motor that is powered by a large capacity battery pack. The battery pack typically acts as a high voltage (e.g., 300-400V) direct current (dc) source. The electric motor is typically an alternating current motor. Accordingly, in order to drive the electric motor, the dc power from the battery pack is converted to alternating current or quasi-alternating voltage or current by an inverter. The inverter may be commercially provided in the form of a power module, comprising an array of power switches such as IGBTs, which form an inverter bridge as known in the art. The power module is typically commercially available in the form of a large isolated package (that may be, for example, about 200 mm×100 mm×30 mm) with several terminals for connecting to other electric drive components.

The power switches in the power module are switched at a relatively high frequency, e.g., 5 to 10 kHz or higher. At these frequencies, the inherent inductance of the system can cause large transient voltages to occur. These large transient voltages are undesirable because they can require the system designer to user more costly circuit components capable of handling high peak voltages. It is therefore desirable to reduce system inductance so as to avoid having to use such costly circuit components.

The system inductance includes several sources of inductance. One source of extraneous or stray inductance occurs in the power lines or bus bar used to couple the power module to other components of drive system.

For instance, in conventional high voltage electrical drive systems a large smoothing capacitor is typically connected across the inverter bridge. The smoothing capacitor is also typically commercially available in the form of an isolated package (which may be, for example, about 200 mm×70 mm×70 mm) with terminals for connecting to other components such as the power module. A bus bar may be used to connect the power module to the smoothing capacitor.

A conventional bus bar is a rigid high capacity conductor with terminals for connecting to terminals of other electrical components. Since the drive system is used in a vehicular application where the system may be subject to significant vibration during operation, the terminals of the various electrical drive components may be securely fastened together (e.g. using nuts and bolts that are fastened to one another with a selected torque) to prevent unintended consequences.

A conventional bus bar can carry significant stray inductance however, depending on its structure, size, the spacing between the positive and negative rails, and how well aligned the positive and negative rails are to one another. For example, a conventional bus bar assembly may have an inductance in the tens of microHenrys. The bus bar terminals and connecting structure in particular are a source for stray inductance since the structure of the bus bar is particularly non-uniform at the terminals and connecting structure.

It would be advantageous to provide a bus bar connector that provides reduced inductance as compared to some currently available bus bar connectors.

SUMMARY

In one aspect, a set of bus bars is provided, comprising a male bus bar and a female bus bar. The male bus bar includes a first conductor overlying a second conductor and having a first insulation layer positioned between the first and second conductors. A portion of the male bus bar is a male connecting portion that includes at least one finger provided by the first and second conductors and the insulation layer. The female bus bar includes a third conductor overlying a fourth conductor and having a second insulation layer positioned between the third and fourth conductors. A portion of the female bus bar is a female connecting portion that includes at least one receptacle provided by a divergence between the third and fourth conductors. The at least one receptacle has contact surfaces that are free of insulation and that are positioned to contact contact surfaces on the at least one finger which are free of insulation so as to connect the first conductor and the third conductor and to connect the second conductor and the fourth conductor. The at least one finger has a width and a gap exists between the contact surfaces of the at least one receptacle. The width and the gap are sized to provide a press fit between the at least one finger and the at least one receptacle when the at least one finger is inserted into the at least one receptacle.

The female bus bar may include an opening immediately adjacent each receptacle so as to space each finger from other portions of the female bus bar.

The male bus bar may have at least two fingers arranged in parallel, in which case a slot is provided between each immediately adjacent pair of projecting planar fingers.

At least one of (i) the first and second conductor and (ii) the third and fourth conductors may include metal that flows.

The set of bus bars provides a smoothly flowing structure that reduces stray inductance and reduces assembly complexity.

BRIEF DESCRIPTION OF THE DRAWINGS

The foregoing and other aspects of the disclosure will be more readily appreciated having reference to the drawings, wherein.

DETAILED DESCRIPTION

Figure 1:
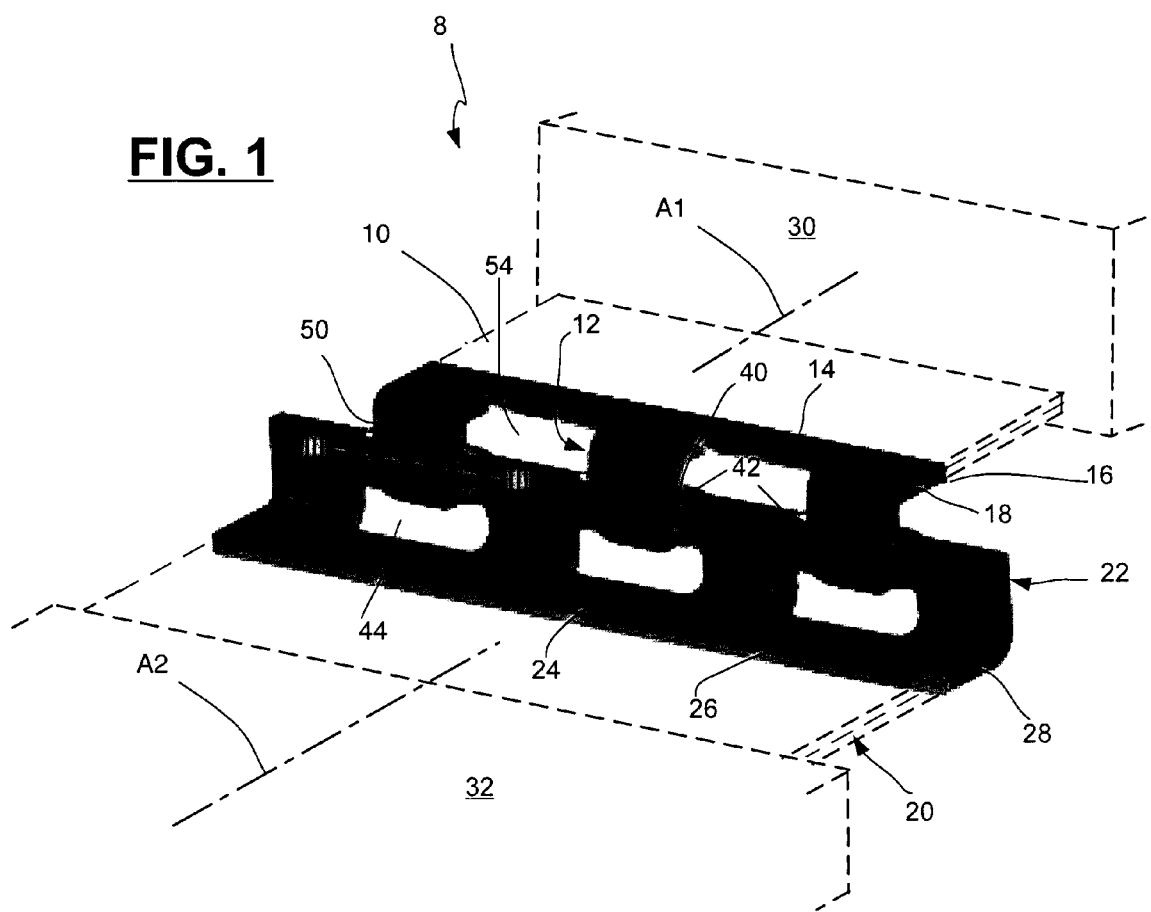
FIG. 1 is a perspective view of an embodiment of a bus bar connector.

FIG. 1 shows a set 8 of bus bars, including a first bus bar 10 and a second bus bar 20. The first bus bar 10 may include a male connector portion 12. The second bus bar 20 may include a female connector portion 22. The male connector portion 12 is connectable to the female connector portion 22 as described in greater detail below. Due to the male and female connector portions 12 and 22, the first and second bus bars 10 and 20 may be referred to as male and female bus bars 10 and 20 respectively.

The first bus bar 10 (and therefore the male connector portion 12) includes a first conductor 14 that may be planar, which is overlaid on a second planar conductor 16 that may be planar, with a first insulation layer 18 in between the conductors 14 and 16. In addition to providing the insulation layer 18 between the first and second conductors 14 and 16, the insulation layer 18 may envelop the first and second conductors so as to protect people against electric shock and to prevent conduction into objects that inadvertently contact the conductors 14 and 16 while the conductors 14 and 16 are connected to a voltage source. The portion of the insulation layer 18 that envelops the first and second conductors 14 and 16 is not shown in the figures so as not to obscure the conductors 14 and 16 themselves.

The first and second conductors 14 and 16 carry currents of opposite polarities. The first conductor 14 may be a positive conductor and the second conductor 16 may be a negative conductor. Alternatively, the first and second conductors 14 and 16 may be negative and positive conductors respectively.

The second bus bar 20 (and therefore the female connector portion 22) includes a third planar conductor 24 overlaid over a fourth planar conductor 26 with a second insulation layer 28 in between the conductors 24 and 26. In addition to providing the insulation layer 28 between the first and second conductors 24 and 26, the insulation layer 28 may envelop the third and fourth conductors 24 and 26 so as to protect people against electric shock and to prevent conduction into objects that inadvertently contact the conductors 24 and 26 while the conductors 24 and 26 are connected to a voltage source. The portion of the insulation layer 28 that envelops the third and fourth conductors 14 and 16 is not shown in the figures so as not to obscure the conductors 24 and 26 themselves.

The third and fourth conductors 24 and 26 carry currents of opposite polarities. The third conductor 24 may be a positive conductor and the fourth conductor 26 may be a negative conductor. Alternatively, the third and fourth conductors 24 and 26 may be negative and positive conductors respectively.

The conductors 14, 16, 24 and 26 may be formed from any suitable material such as copper or aluminum. The insulation layers 18 and 28 may be formed from any suitable material such as a thin layer of epoxy glass or thin layers of Mylar® bonded to Tedlar®.

The first and second bus bars 10 and 20 are only partially shown. The bus bars 10 and 20 are connected (e.g. by wire bonding) to first and second electrical components 30 and 32 (shown schematically in FIG. 1) respectively. The first and second electrical components 30 and 32 may, for example, form part of an electrical drive system for an electric vehicle. The term 'electric vehicle' as used herein denotes a vehicle that includes an electric traction motor (which may be referred to simply as an 'electric motor', a 'traction motor' or a 'motor' for convenience). The electric vehicle may also include an internal combustion engine, or alternatively it may lack an internal combustion engine. In embodiments wherein an internal combustion engine is provided, the engine may be operated simultaneously with the electric traction motor (parallel hybrid), or it may be operated only when a battery pack for powering the electric traction motor has been substantially depleted (or depleted to a minimum acceptable state of charge). In embodiments wherein an engine is provided, the function of the engine may be to propel the vehicle, to charge the battery pack, both propelling the vehicle and charging the battery pack, or for some other reason. Furthermore, the electric vehicle may be any suitable type of vehicle, such as, for example, an automobile, a truck, an SUV, a bus, a van or any other type of vehicle.

The first electrical component 30 may be a power module and the second electrical component 32 may be a smoothing capacitor 32. The lengths of the bus bars 10 and 20 may vary depending on the physical packaging space available and the length needed to span the distance between the components (e.g. between the power module 30 and the smoothing capacitor 32).

The male connector portion 12 may include a plurality of fingers 50 which extend perpendicularly to the longitudinal axis of the first bus bar 10, shown at A1. The female connector portion 22 may include a plurality of receptacles 40 which extend perpendicularly to the longitudinal axis of the second bus bar 20, shown at A2 (which may be generally parallel to the first bus bar axis A1. The male and female connector portions 12 and 22 are connectable together by insertion of the fingers 50 of the male connecting portion 12 into the receptacles 40 of the female connecting portion 22 to form an electrical connection between the first and second bus bars 10 and 20. Providing fingers 50 and receptacles 40 that extend perpendicularly to the axes A1 and A2 may facilitate joining of the male and female connector portions 12 and 22 together, particularly when external components may be used to hold and stabilize the connector portions 12 and 22 during insertion of the fingers 50 into the receptacles 40. However, the fingers 50 and receptacles 40 are not limited to any particular angles and the connector portions 12, 22 may be in line with the remainders of the bus bars 10 and 20.

Figure 2:
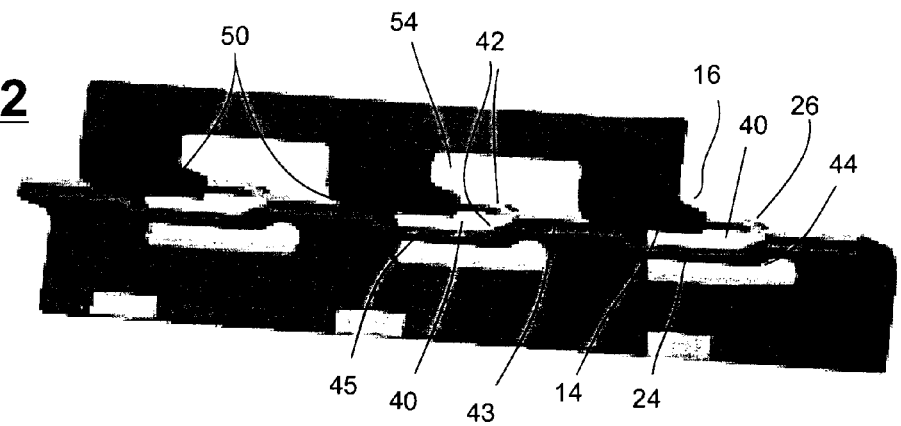
FIG. 2 is a partially exploded view of the bus bar connector shown in FIG. 1.
Figure 3:
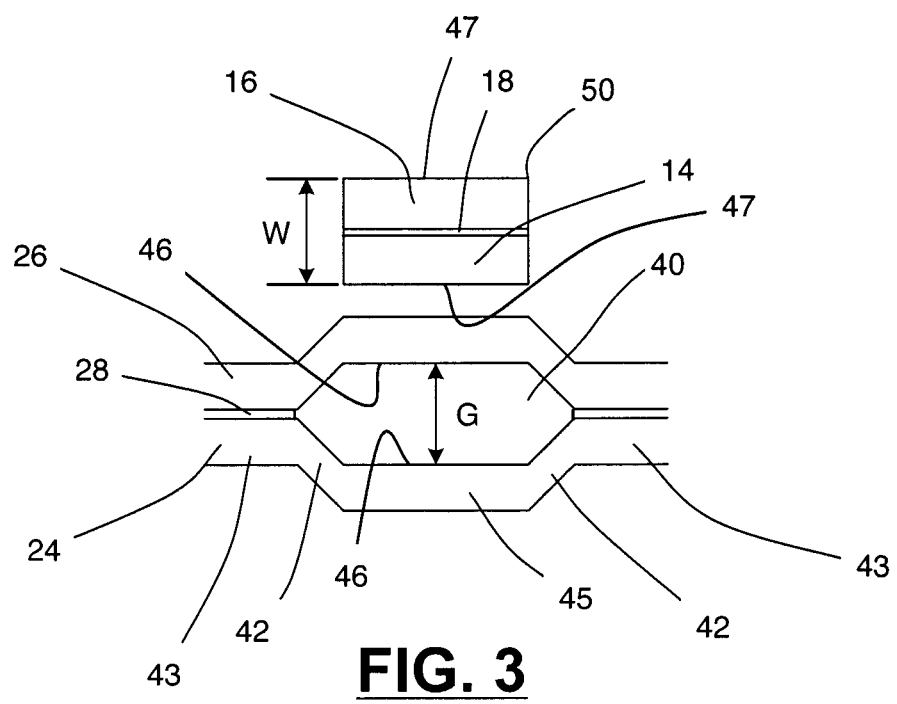
FIG. 3 is a magnified cross-sectional view along line III-Ill of FIG. 2.

As seen in FIGS. 1 and 2, there may be three receptacles 40 and three fingers 50 (i.e. each finger 50 has an associated receptacle 40). In alternative embodiments there may be more or fewer receptacles 40 and fingers 50. In an embodiment, there could be as few as one finger 50 and one receptacle 40.

Each receptacle 40 is formed by a divergence between the positive and negative conductors 24 and 26. Each receptacle 40 includes a plurality of spring portions 42, and first and second contact portions 45 (one contact portion 45 for the positive conductor 24 and one for the negative conductor 26). The spring portions 42 may extend between a base portion 43 of the bus bar 20 and the contact portions 45. The contact portions 45 have contact surfaces 46 thereon that contact contact surfaces 47 on the fingers 50 so as to provide an electrical connection with the fingers 50 of the bus bar 10. The portion of the insulation layer 28 that is between the positive and negative conductors 24 and 26 is not present in the receptacles 40. Thus the contact surfaces 46 are free of insulation, so as to permit the contact surfaces of the contact portions 45 to be conductive. The spring portions 42 are described further below.

The receptacle 40 may be formed by individually stamping or pressing each of the third and fourth conductors 24 and 26 prior to joining the conductors 24 and 26 together. An opening 44 is provided immediately inboard of each receptacle 40. The openings 44 may be formed through a cutting operation.

The opening 44 underneath each receptacle 40 ensures that, when an associated finger 50 is pushed through the receptacle 40, the finger 50 does not contact another portion of the female connector portion 22 in order to prevent a short circuit.

On the male connector portion 12 the fingers 50 are separated by slots 54. The slots 54 may be formed by a cutting operation. Each finger 50 is inserted into a corresponding one of the receptacles 40 so that one of the contact surfaces 47 that is on the positive conductor 14 of the finger 50 contacts one of the receptacle contact surfaces 46 that is on the positive conductor 24, and one of the contact surfaces 47 that is on the negative conductor 16 of the finger 50 contacts one of the receptacle contact surfaces 46 that is on the negative conductor 26. Each finger 50 includes the portion of the insulating layer 18 between the first and second conductors 14 and 16, however the portion that envelops the outer surfaces of the conductors 14 and 16 is not present on the finger 50 so that the contact surfaces 47 of the finger 50 are conductive and can make a strong electrical connection with the contact surfaces 46 on the receptacles 40.

Each finger 50 may have a cross-sectional width (shown at W) that is larger by a selected amount than a gap (shown at G) between the contact portions 45 the receptacle 40. As a result, the physical connection between the fingers 50 and the receptacles 40 may be by way of an interference fit. The spring portions 42 and the contact portions 45 may flex to allow the finger 50 into the receptacle 40 and provide a snug fit to provide surface-to-surface contact across the interface between the outer surfaces of the fingers 50 and the inner surfaces of the contact portions 45 of the receptacles 40. If desired, the end portion of each finger 50 may be tapered to facilitate access into the corresponding receptacle 40.

The openings 44 adjacent each receptacle 40 prevent the associated finger 50 from contacting portions of the bus bar 40 other than the contact surfaces 45 so as to prevent unwanted electrical connections from being made between portions of the finger 50 and any other portions of the bus bar 40.

In an embodiment the metal from which the fingers 50 are made may be capable of flowing so that when the fingers 50 are inserted into the receptacles 40 the forces exerted on the fingers 50 causes the metal of the fingers 50 to flow and fill any spaces in between the fingers 50 and the contact portions 45 of the receptacles 40. As a result, there is surface-to-surface contact across substantially the entirety of the mutually overlapping portions of their respective surfaces. This may result in a permanent connection between the bus bars 10 and 20.

Instead of using a flowable metal for the entirety of the conductors 14 and 16 of the fingers 50, it is alternatively possible for the fingers 50 to be include a base portion made from the conductors 14 and 16, and to further include coating layer, on top of the base portion, which is formed from a flowable conductive material, such as a flowable metal. The coating layer permits the fingers 50 to flow sufficiently to fill any spaces that might otherwise exist between the fingers 50 and the contact surfaces 45, thereby providing surface-to-surface contact across substantially the entirety of the mutually overlapping portions of their respective surfaces.

Instead of the fingers 50 including a flowable material, the receptacles 40 may alternatively include a flowable material. In another alternative, both the fingers 50 and the receptacles 40 can include a flowable material.

In an alternative embodiment, the width W and the gap G may be sized so that the fit between the fingers 50 and the receptacles 40 is a press-fit instead of an interference fit. For greater clarity, a press-fit may exist even if the width W is not larger than the gap G (e.g. where the width W is the same as the gap G or where the width W is slightly smaller than the gap G), whereas for an interference fit, the width W is larger than the gap G. When a press-fit is provided there may not be a flow of material to ensure good contact between the contact surfaces 46 and 47. When a press-fit is provided a conductive adhesive or the like may be provided between the fingers 50 and the receptacles 40.

The bus bar connector 8 described above eliminates the need to use bolts or screws, which reduces stray inductance, simplifies assembly of the first and second bus bars 10 and 20, and additionally reduces parts count associated with their assembly to each other.

Those skilled in the art will appreciate that various alternations and modifications may be made to the embodiments described above without departing from the fair scope of the appended claims.

The invention claimed is:

1. A set of bus bars, comprising:
   a male bus bar including a first conductor overlying a second conductor and having a first insulation layer positioned between the first and second conductors, wherein a portion of the male bus bar is a male connecting portion that includes at least one finger provided by the first and second conductors and the insulation layer; and
   a female bus bar, including a third conductor overlying a fourth conductor and having a second insulation layer positioned between the third and fourth conductors, wherein a portion of the female bus bar is a female connecting portion that includes at least one receptacle provided by a divergence between the third and fourth conductors, wherein the at least one receptacle has contact surfaces that are free of insulation and that are positioned to contact contact surfaces on the at least one finger which are free of insulation so as to connect the first conductor and the third conductor and to connect the second conductor and the fourth conductor,
   wherein the at least one finger has a width and wherein a gap exists between the contact surfaces of the at least one receptacle, wherein the width and the gap are sized to provide a press fit between the at least one finger and the at least one receptacle when the at least one finger is inserted into the at least one receptacle.

2. A set of bus bars as claimed in claim 1, wherein the width of the at least one finger and the gap between the contact surfaces of the at least one receptacle are sized to provide an interference fit between the at least one finger and the at least one receptacle when the at least one finger is inserted into the at least one receptacle.

3. A set of bus bars as claimed in claim 2, wherein the at least one finger includes a flowable material that flows to provide substantially complete surface-to-surface contact between mutually overlapping portions of the contact surfaces of the at least one finger and the at least one receptacle.

4. A set of bus bars as claimed in claim 2, wherein the at least one receptacle includes a flowable material that flows to provide substantially complete surface-to-surface contact between mutually overlapping portions of the contact surfaces of the at least one finger and the at least one receptacle.

5. A set of bus bars as claimed in claim 1, wherein the female bus bar includes an opening immediately adjacent each receptacle so as to space each finger from other portions of the female bus bar when the finger is inserted into the receptacle.

6. A set of bus bars as claimed in claim 1, wherein the second bus bar includes a base portion and a plurality of contact portions on which the contact surfaces of the at least one receptacle are provided, and wherein the at least one receptacle includes a plurality of spring portions extending between the base portion and the plurality of contact portions to permit the contact portions to move apart to accommodate insertion of the at least one finger in the at least one receptacle.

* * * * *